United States Patent [19]

Volgstadt et al.

[11] 4,083,583
[45] Apr. 11, 1978

[54] PIPE FITTING HAVING A NON-METALLIC SEALING MEMBER

[75] Inventors: Frank R. Volgstadt, Madison; David P. Passerell, Geneva, both of Ohio

[73] Assignee: Perfection Corporation, Madison, Ohio

[21] Appl. No.: 739,839

[22] Filed: Nov. 8, 1976

[51] Int. Cl.² ............... F16L 9/14; F16L 15/00
[52] U.S. Cl. ........................ 285/55; 285/158; 285/355
[58] Field of Search ............ 285/355, 332.2, 332.3, 285/55, 355

[56] References Cited

U.S. PATENT DOCUMENTS

| | | | |
|---|---|---|---|
| 3,108,826 | 10/1963 | Black | 285/355 X |
| 3,167,333 | 1/1965 | Hall et al. | 285/333 X |
| 3,192,612 | 7/1965 | Elliott et al. | 285/55 X |
| 3,596,931 | 8/1971 | Mishler | 285/355 X |
| 3,811,710 | 5/1974 | Dula et al. | 285/355 X |
| 3,863,963 | 2/1975 | Hershey | 285/355 X |
| 3,891,530 | 6/1975 | Alewitz | 204/197 |

Primary Examiner—Thomas F. Callaghan
Attorney, Agent, or Firm—Fay & Sharpe

[57] ABSTRACT

A pipe fitting comprising interconnected threaded male and female members. A fitting element in the form of a non-metallic ring is defined by a tubular body, a radial flange and a sealing portion extending from the radial flange. The tubular body of the ring is adapted to be inserted into the male member such that the radial flange overlies the end wall of the male member. The outer periphery of the sealing portion of the ring has a diameter greater than the minor diameter of the threads of the female member. As a result, a part of the sealing portion is caused to be captured between opposed thread flanks of the male and female members upon make-up of the fitting thus providing for enhanced sealing at the threads of the fitting. In addition, the ring serves to isolate the end wall of the male member from contact with fluid thus making the fitting advantageous in the embodiment in which a non-metallic lining is provided in the male member.

2 Claims, 5 Drawing Figures

U.S. Patent  April 11, 1978  4,083,583
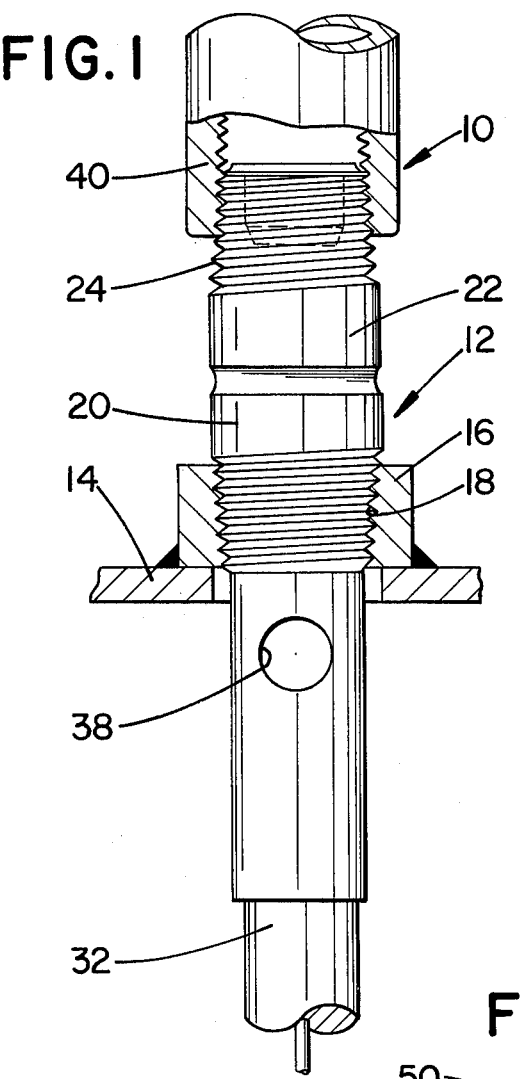
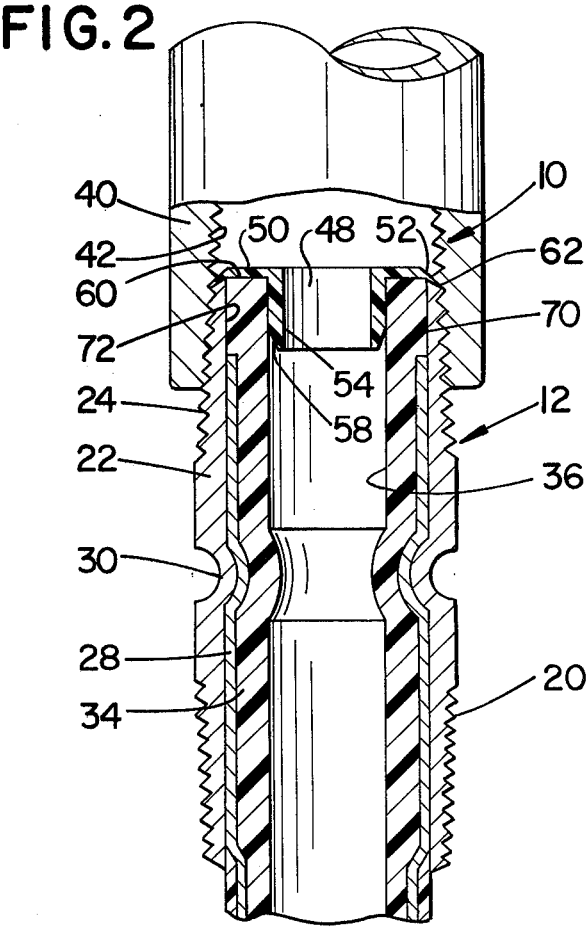
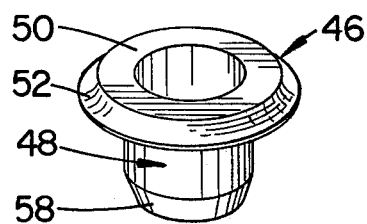
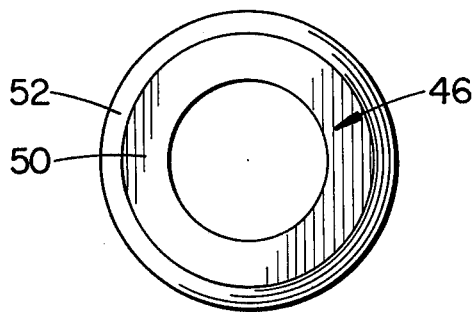
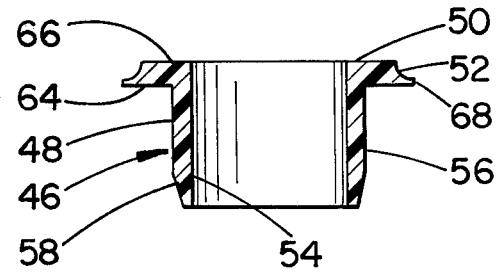

4,083,583

PIPE FITTING HAVING A NON-METALLIC SEALING MEMBER

BACKGROUND OF THE INVENTION

This invention relates to a pipe fitting and, in particular, a pipe fitting in which a non-metallic ring is adapted for use with threadedly interconnected male and female members.

When pipe fittings are made up it is sometimes desirable to provide sealants or other means at the threads in order to prevent the escape of fluid. It has been known, for example, to apply liquid or paste type sealant materials to the threads prior to make-up of the fitting. It has also been known to provide for the application of fluoroplastic protective ribbons at the threaded interface of a pipe fitting for purposes of filling the space between adjacent thread flanks.

This invention relates to a pipe fitting and a non-metallic ring for use in conjunction with a pipe fitting and wherein the ring is provided with a sealing portion which is adapted to be engaged by interconnecting threads of the respective joint members. As a result there is provided enhanced sealing at the joint upon make-up. The ring also serves to isolate the end wall of one of the members of the pipe joint making it possible to advantageously cooperate with a pipe lining thus isolating the member from contact with fluid.

SUMMARY OF THE INVENTION

Briefly summarized, this invention provides for an improved pipe fitting in which a non-metallic sealing member is caused to be disposed between opposed flanks of interconnecting threads of the male and female elements of the fitting. The sealing member is defined by a sealing lip which is carried by the radial flange of a non-metallic annular ring carried by the male member of the pipe joint. The ring is provided with a tubular body which is inserted into the male member in close contact with the internal wall of the male member. The radial flange is caused to overlie the end wall of the male member and cooperates with the sealing lip to isolate the end wall of the male member from contact with fluid. Where the male member is provided with a non-metallic interior lining the ring advantageously provides for complete sealing of the end portion of the male member thus isolating the male member from contact with fluid.

DESCRIPTION OF THE INVENTION

A more complete description of the invention will now be made with reference to the attached drawings in which:

FIG. 1 is an elevational view partly in section and partly in phantom and showing the pipe fitting of this invention secured to an anode-outlet of a water heater;

FIG. 2 is an elevational view, partly in section, and showing the pipe fitting of this invention;

FIG. 3 is an elevational view of the nonmetallic fitting ring of this invention;

FIG. 4 is a top elevational view of the ring shown in FIG. 3; and

FIG. 5 is a side cross-sectional view of the ring shown in FIG. 3.

Turning now to FIG. 1, the pipe fitting of this invention, which is generally designated 10, is shown in combination with an anode-outlet 12 installed in the top wall 14 of a water heater. An internally threaded spud 16 is welded to wall 14 and defines internal threads 18 which receive external threads 20 of the anode-outlet 12.

Although the anode-outlet 12 of FIG. 1 forms no part of this invention, a brief description of this element is believed to be helpful in understanding the contribution made by the invention of this application.

As shown in FIGS. 1 and 2 the anode-outlet 12 consists of a metallic nipple 22 having external threads 20, 24 at the respective ends thereof. A metallic sleeve 28 is received within nipple 22 and is secured to the internal wall thereof by means of the generally inwardly extending annular rib or corrugation 30. Although not shown in either FIGS. 1 or 2 the sleeve 28 functions to grip and retain the magnesium anode 32 (FIG. 1) while providing for an electrical interconnection between the anode 32 and the wall 14 of the water heater. A plastic sleeve or lining 34 is provided at the interior of the anode-outlet 12 and defines a waterway 36 for the flow of hot water from the water heater. An aperture 38 is defined in the side wall of the anode-outlet 12 and intersects the waterway 36 in order to provide for the introduction of water into the waterway 36.

As will be apparent from a study of FIG. 2, the nonmetallic sleeve or lining 34 isolates the metallic sleeve 28 and the nipple 22 from contact with fluid thus tending to diminish or reduce altogether corrosion of these parts as the anode-outlet 12 is placed in service in a water heater.

As has previously been noted the anode-outlet 12 as shown in FIGS. 1 and 2 forms no part of the invention of this application except insofar as the pipe fitting of this invention may be used in combination with the anode-outlet. For a more complete description of the anode-outlet reference is made to U.S. Letters Pat. Nos. 3,542,663 and 3,891,530 which are owned by Perfection Corporation of Madison, Ohio, the assignee of this application.

This invention is broadly designated 10 in FIGS. 1 and 2 and provides for a pipe fitting between an externally threaded tubular male member and an internally threaded female member. In the preferred embodiment of the invention as shown in FIG. 2 the externally threaded tubular male member is designated as nipple 22 and the internally threaded female member is designated as element 40. The connection between nipple 22 and element 40 is provided primarily by means of interengaging external threads 24 on the nipple and internal threads 42 defined by the element 40.

As will be apparent from FIG. 2, element 40 may be defined by a section of pipe or a plumbing element such as a "T", "L" or any other element which is convenient or desirable for purposes of conducting the flow of fluid.

Disposed within the externally threaded tubular male member 22 is a generally annular ring 46. Ring 46 (as shown individually in FIGS. 3-5) includes a tubular body 48, a radial flange 50 and a thread engaging sealing portion or lip 52.

Tubular body 48 of ring 46 is provided with an internal wall 54 and an external wall 56. Internal wall 54 defines a passageway for the flow of fluid through the fitting. External wall 56 is adapted to be brought into tight fitting engagement with the internal surface of the male member. In the preferred embodiment as shown in FIG. 2, the internal surface of the male member or nipple 22 is provided with a lining 34. Thus, the dimension of the external wall 56 is selected so that the tubular body 48 of ring 46 is in tight fitting engagement with the lining 34. A tapered surface 58 is defined at the inner end of the external wall 56 of tubular body 48 in order to facilitate the installation of the ring 46 in the tubular male member as shown in FIG. 2.

At the upper end of the tubular body 48 there is provided a substantially generally transversely outwardly extending radial flange 50. As will be noted in FIG. 2 the transverse dimension of flange 50 is such that it extends over the end wall 60 of lining 34 and, in addition, extends at least partially over the end wall 62 of the nipple 22. As is shown in FIG. 5, radial flange 50 is defined by an inner wall 64 and a generally parallel outer wall 66. Inner wall 64 is, in the preferred embodiment, brought to bear into close contact with end wall 60 of lining 34 and at least a portion of end wall 62 of nipple 22. The engagement of ring 46 with the respective end walls 60, 62 of the lining and nipple is enhanced by the cooperation of the sealing portion 52 and the interengaging threads 24, 42 as will be explained further below.

As will be noted from FIGS. 3 and 5 radial flange 50 is generally circular in configuration. Depending therefrom is sealing portion or lip 52 which extends generally radially outwardly from radial flange 50.

Sealing portion 52, in the preferred embodiment, is defined in section by a lip having a thickness which decreases along a transverse axis of ring 46. As will be apparent from FIG. 5, the thickness of the sealing lip decreases from a maximum at the radial flange 50 to a minimum at the outer edge 68. As will further be appreciated from a study of FIG. 5 outer edge 68 is substantially coplanar with the inner wall 64 of flange 50.

The outer periphery of the sealing portion 52 of ring 46 or, stated in other words, the outer periphery of the edge 68, has a diameter greater than the minor diameter of the threads 42 of element 40. Thus, with the ring 46 installed in the position of FIG. 2 there is created an interference relationship between the sealing portion 52 of the ring and the interengaging threads 42, 24 of members 40, 22. As the element 40 is advanced onto the nipple 22 parts of the sealing portion 52 of the ring are caused to be captured or trapped between opposed flanks of the interengaging threads 42, 24. As a consequence thereof, sealing is enhanced at the interengaging threads 42, 24.

In the preferred embodiment, ring 46 is integrally molded from plastic material in the configuration shown in FIGS. 3–5. While polypropylene material is used although other materials should be considered within the spirit of this invention. Also in the preferred embodiment, the sealing portion 52 has a cross-sectional thickness at the edge 68 (as shown in FIG. 5) of approximately 1/64 inch in the ¾ inch pipe size ring.

Applicant has found that in alternate embodiments it is possible to define a sealing lip at the outer periphery of the radial flange of the ring by advantageously providing for the formation of flash on the radial flange during molding of the ring.

Generally speaking, in order to insure an interference engagement of the sealing portion of the ring with the threads of the pipe joint it is necessary to provide that the outer diameter of the sealing lip should exceed the minor diameter of the internal threads of the female member. In the preferred embodiment, Applicant provides that the diameter of the outer extremity or the outer edge 68 of the sealing lip should be substantially equal to the average pitch diameter of the pipe thread 42 defined by element 40. Within the spirit of this invention, however, should be considered various alternative dimensions at the sealing portion of the ring that would provide for interference engagement of the ring with the pipe joint threads. Interference is established when the diameter of the outer edge of the sealing ring lies in the range between the minor and major diameters of the internal threads of element 40.

In addition to enhancing sealing at the threaded interface between the male and female members of the pipe fitting of this invention, ring 46 serves the additional purpose of maintaining the fluid tight integrity of a lined tubular male element of the type shown in FIG. 2.

It was previously noted that the pipe fitting of this invention is advantageously used in connection with an anode-outlet 12 of the type shown in FIGS. 1 and 2. The lining 34 which is provided at the interior of nipple 22 and sleeve 28 is, in the preferred embodiment of FIG. 2, fabricated from white polypropylene and serves to define an internal waterway 36 while, at the same time, isolating the metallic members 22, 28 from contact with fluid. Lining 34 thus tends to inhibit corrosion of the metallic elements of the anode-outlet.

It has been found, however, that the upper portion 70 of lining 34 may, in some circumstances, pull away from the internal wall 72 of nipple 22 thus defining a very slight annular space exposed to fluid. This annular space thus serves to introduce fluid to the metallic members defining the anode-outlet 12 with resulting corrosion and degradation of these members.

Applicant's ring 46 advantageously serves as an end shield or sealing means which serves to inhibit the flow of fluid into any space that may be created between the matallic tubular pipe and the internal plastic lining thereof. In the preferred embodiment of FIG. 2 the radial flange 50 and sealing portion 52 cooperate to tightly and sealingly engage the end wall 60 of lining 34 and the end wall 62 of nipple 22 thus to prevent the flow of fluid into contact with the metallic nipple 22 or any internal portions of the anode-outlet such as the metallic sleeve 28.

This invention, therefore, has application not only with respect to unlined fitting members but also with respect to any type of lined pipe wherein it is desirable to insure the maintenance of fluid tight integrity of the end portions of the pipe and lining.

It was previously indicated that the tubular body 48 of ring 46 was closely received within the internal wall of lining 34 defining waterway 36. In the preferred embodiment the tubular body of the ring is positioned close to the wall defining lining 34 such that the flow of fluid between these elements is effectively prohibited.

It will be appreciated that as sealing portion 52 is brought into an interference relationship with interengaging threads 42, 24 radial flange 50 will be biased into close engagement with end walls 60, 62 of the respective lining 34 and nipple 22. This movement of the ring during take-up of the fitting serves to enhance sealing upon takeup.

A still further advantage of the invention of this application resides in the fact that the sealing ring 46 serves to isolate what may, in some cases, be severe localized electrolytic action caused by fluid coming into contact with dissimilar metals. For example, should the nipple 22 and element 40 be fabricated from dissimilar metals it may be expected that advanced corrosion will take place at the threaded interconnection of these members in the presence of an electrolytic fluid. Applicant's novel sealing ring serves to isolate the interengaging dissimilar metals from contact with fluid thus serving to greatly reduce corrosion at the interface of these metals.

Alternate embodiments of Applicant's preferred apparatus should be considered within the spirit of the invention. For example, the tubular body 48 of ring 46 may be retained in the threaded male member in several ways. The ring may be press fitted into the male member or, alternately, snapped in place utilizing cooperating elements of both the male member and the ring. Also it is contemplated that the ring may be retained in place in the male member by solvent welding or other bonding techniques.

While applicant prefers to mold the sealing ring as a one-piece integral unit alternate constructions may be employed. For example, the sealing portion of the ring could be fabricated as an independent element which is carried by the ring and brought into interference engagement with interconnecting threads of the pipe joint.

What is claimed is:

1. A pipe fitting comprising in combination:

an externally threaded tubular male member having a non-metallic lining at the interior surface thereof;

an internally threaded female member threadedly interconnected to said male member;

a non-metallic ring comprising a tubular body, a radial flange extending substantially generally transversely outwardly from said tubular body and a thread engaging sealing portion extending generally radially outwardly from said radial flange;

said sealing portion having an outer periphery having a diameter greater than the minor diameter of the threads of said female member;

said sealing portion being defined by a lip having a thickness which decreases along the transverse axis of said ring to a minimum thickness at the outer edge of said lip;

a part of said sealing portion being adapted to be disposed between opposed thread flanks of said male member and said female member as said male member and said female member are brought into threaded engagement, the space between said opposed thread flanks being substantially filled by said part of said sealing portion to thereby provide a seal at said opposed thread flanks;

said tubular body of said ring being disposed in said tubular male member in close engagement with the non-metallic lining thereof;

said radial flange of said sealing portion being disposed over the end wall of said lining and the end wall of said tubular male member and in close contact therewith whereby, said ring serves to isolate said tubular male member from contact with fluid conducted by said member.

2. The invention of claim 1 in which said ring is provided with a tapered surface at the external surface of said tubular body and adjacent the end thereof in order to facilitate the insertion of said ring in said tubular male member.

* * * * *